United States Patent
Zuberec et al.

(10) Patent No.: US 6,298,324 B1
(45) Date of Patent: *Oct. 2, 2001

(54) SPEECH RECOGNITION SYSTEM WITH CHANGING GRAMMARS AND GRAMMAR HELP COMMAND

(75) Inventors: Sarah E. Zuberec, Seattle; Lisa Matheson, Redmond; Craig Cyr, Clinton; Hang Li, Redmond; Steven P. Masters, Kent, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/191,048

(22) Filed: Nov. 12, 1998

Related U.S. Application Data

(63) Continuation-in-part of application No. 09/003,055, filed on Jan. 5, 1998.

(51) Int. Cl.[7] .................................................. G10L 15/22
(52) U.S. Cl. ............................................ 704/251; 704/275
(58) Field of Search .................................... 704/260, 270, 704/275, 276, 231, 251, 254, 255

(56) References Cited

U.S. PATENT DOCUMENTS

| | | | |
|---|---|---|---|
| 5,465,378 | * 11/1995 | Duensing et al. | 707/529 |
| 5,632,002 | * 5/1997 | Hashimoto et al. | 704/231 |
| 5,664,061 | * 9/1997 | Andreshak et al. | 704/275 |
| 5,752,232 | 5/1998 | Basore et al. | 704/275 |
| 5,794,164 | * 8/1998 | Beckert et al. | 455/456 |
| 5,867,817 | * 2/1999 | Catallo et al. | 704/255 |
| 5,873,064 | * 2/1999 | Armas et al. | 704/275 |
| 6,085,159 | * 7/2000 | Ortega et al. | 704/235 |

FOREIGN PATENT DOCUMENTS

| | | |
|---|---|---|
| 0 785 540 A2 | 7/1997 | (EP) . |
| WO 99/48088 | 9/1999 | (WO) . |
| 99/48088 | * 9/1999 | (WO) ........................ G10L/9/06 |

* cited by examiner

*Primary Examiner*—Richemond Dorvil
*Assistant Examiner*—Angela Armstrong
(74) *Attorney, Agent, or Firm*—Lee & Hayes, PLLC

(57) ABSTRACT

A speech recognition system has an operator interface that helps a user navigate new or changing grammars. The speech recognition system includes an application, a vocabulary that holds a set of utterances applicable to the application, and an active grammar that holds a subset of the utterances in the vocabulary. The active grammar includes a help command as well as other options. The speech recognition system has a speech recognition engine to recognize the utterances in the active grammar, including the help command. When the help command is detected, the operator interface verbally enunciates the utterances in the grammar so that the user can hear the available options in a hands-free, eyes-off operating environment. In this way, any time the user does not know or forgets the available options, he/she simply speaks the help command, such as asking "What can I say." The system responds verbally with a list of currently available words and/or phrases in the active grammar.

31 Claims, 7 Drawing Sheets

SPEECH RECOGNITION SYSTEM WITH CHANGING GRAMMARS AND GRAMMAR HELP COMMAND

RELATED APPLICATIONS

This is a continuation in part of a prior U.S. patent application filed Jan. 5, 1998, titled "Ballooning Grammars in Speech Recognition", Ser. No. 09/003,055 to Zuberec et al. Priority is hereby claimed to this earlier application.

TECHNICAL FIELD

This invention relates to speech recognition systems. More particularly, this invention relates to speech recognition systems with changing grammars and to methods for assisting the user with what options are available in the currently active grammar. This invention further relates to vehicle computer systems and other electronic devices that implement such speech recognition systems.

BACKGROUND

Two common types of speech recognition systems are continuous and discrete. Continuous speech recognition systems detect and discern useful information from continuous speech patterns. In use, an operator may speak phrases and sentences without pausing and the continuous speech recognition system will determine the words being spoken. Continuous speech recognition systems are used, for example, in voice-input word processors that enable operators to dictate letters directly to the computer.

Discrete speech recognition systems are designed to detect individual words and phrases that are interrupted by intentional pauses, resulting in an absence of speech between the words and phrases. Discrete speech recognition systems are often used in "command and control" applications in which an operator speaks individual commands to initiate corresponding predefined control functions. In a typical use, the operator speaks a command, pauses while the system processes and responds to the command, and then speaks another command. The system detects each command and performs the associated function.

A discrete speech recognition system employs a complete list of recognized words or phrases, referred to as the "vocabulary." A subset of the vocabulary that the recognition system is attempting to detect at any one time is known as the "active grammar." In general, the smaller the active grammar, the more reliable the recognition because the system is only focusing on a few words or phrases. Conversely, the larger the active grammar, the less reliable the recognition because the system is attempting to discern a word or phrase from many words or phrases.

One conventional approach is to construct a large grammar that encompasses each command option. FIG. 1 shows how this conventional approach might be applied to control an automobile radio. In this example, suppose the system is designed to allow the user to control the radio and access his/her favorite radio stations using voice commands. Using a large active grammar, a default radio grammar 20 might include the radio control words "AM," "FM," "Seek," and "Scan" and all of the preset radio stations. A corresponding command function is associated with each grammar word, as represented in Table 1.

TABLE 1

| Default Grammar | |
| --- | --- |
| Word/Phrase | Command Function |
| AM | Sets the radio to AM band. |
| FM | Sets the radio to FM band. |
| Seek | Directs the radio to seek to a new station. |
| Scan | Directs the radio to scan for a new station. |
| One | Sets the radio to preset station 1. |
| Two | Sets the radio to preset station 2. |
| Three | Sets the radio to preset station 3. |
| Four | Sets the radio to preset station 4. |
| Five | Sets the radio to preset station 5. |
| Six | Sets the radio to preset station 6. |
| Seven | Sets the radio to preset station 7. |
| Eight | Sets the radio to preset station 8. |
| Nine | Sets the radio to preset station 9. |
| Ten | Sets the radio to preset station 10. |

The speech recognition system actively tries to recognize one of these words when the operator speaks. When a grammar word is detected, the speech recognition system performs the appropriate function. Suppose the operator says the word "AM." The discrete speech recognition system detects the active word 22 and performs the corresponding function 24 to set the radio to the AM band.

As noted above, a drawback with presenting a large all-encompassing grammar is that there is a greater likelihood of false recognition by the speech system. For instance, the system may experience trouble distinguishing between the words "FM" and "Seven" when both are spoken rapidly and/or not clearly enunciated. Another problem is that the system may recognize extraneous sounds that aren't intended to be entered as commands. For instance, the system may pick up words from a radio or other background source and carry out actions not intended by the user.

To avoid the problems associated with large grammars, another conventional approach is to construct sets of smaller grammars and navigate between them so that only one grammar is active at one time. FIG. 2 shows an example involving an automobile radio, in which the system begins with a small default grammar and switches to a new grammar upon detection of one or more keywords. With this approach, a default radio grammar 30 might include only the radio control words—"AM," "FM," "Seek," "Scan," and "Preset." A corresponding command function is associated with each grammar word, as represented in Table 2.

TABLE 2

| Default Grammar | |
| --- | --- |
| Word/Phrase | Command Function |
| AM | Sets the radio to AM band. |
| FM | Sets the radio to FM band. |
| Seek | Directs the radio to seek to a new station. |
| Scan | Directs the radio to scan for a new station. |
| Preset | Keyword to bring up preset station grammar |

Upon recognition of the keyword "preset," the speech recognition system changes to a new grammar 32 for detecting the preset station numbers. Table 3 lists the new preset station grammar.

TABLE 3

Preset Station Grammar

| Word/Phrase | Command Function |
|---|---|
| One | Sets the radio to preset station 1. |
| Two | Sets the radio to preset station 2. |
| Three | Sets the radio to preset station 3. |
| Four | Sets the radio to preset station 4. |
| Five | Sets the radio to preset station 5. |
| Six | Sets the radio to preset station 6. |
| Seven | Sets the radio to preset station 7. |
| Eight | Sets the radio to preset station 8. |
| Nine | Sets the radio to preset station 9. |
| Ten | Sets the radio to preset station 10. |

The speech recognition system actively tries to recognize one of these words from the preset station grammar. Suppose the operator says the word "One." The discrete speech recognition system detects the active word 34 and performs the corresponding function 36 to set the radio to the preset station 1.

A drawback with this system is that it forces the users to remember the structure and availability of the grammars. This is particularly difficult in situations where the grammars are new or changing. An example of this situation, is when the user is concentrating on another task and using speech to input commands because their attention, hands, and eyes are otherwise occupied. The user may call out a keyword in one grammar, causing the system to switch to a different grammar, and then subsequently be distracted in their primary task (e.g., driving in traffic) and forget which grammar is currently active. For instance, suppose the operator had called out "preset" to get the preset station grammar of Table 3 and was subsequently interrupted. The system is awaiting words/phrases from the preset station grammar of Table 3. Unfortunately, due to the interruption, the operator may have forgotten that the preset station grammar is active and may attempt to speak commands in the default grammar of Table 2, such as "seek" or "scan." Since these commands are not supported by the currently active grammar, the system will not recognize the commands. This is confusing and frustrating for the operator.

Accordingly, there is a need for improving user interaction with speech recognition systems to assist a user in navigating new or changing grammars.

SUMMARY

This invention concerns a speech recognition system having an operator interface that helps a user navigate new or changing grammars. The speech recognition system includes an application, a vocabulary that holds a set of utterances applicable to the application, and an active grammar that holds a subset of the utterances in the vocabulary. The grammar includes a help command as well as other options.

The speech recognition system also has a speech recognition engine to recognize the utterances in the active grammar, including the help command. When the help command is detected, the operator interface verbally enunciates the utterances contained in the grammar so that the user can hear the available commands that he/she may speak. This verbal enunciation is very helpful in a hands-free, at a glance operating environment.

The speech recognition system facilitates easy interaction in helping a user navigate through the changing grammars. Any time the user gets stuck, he/she simply speaks the help command, such as asking, "What can I say." The system responds verbally with a list of currently available words and/or phrases in the active grammar to inform the user of his/her options.

DETAILED DESCRIPTION

This invention concerns speech recognition systems that employ menu grammars and operator interfaces to assist a user in navigating new or changing menu grammars. The invention is described in the context of a discrete speech recognition system.

However, aspects of the invention can be applied to continuous speech recognition systems as well. The invention may be implemented in disability software directed toward people with disabilities, operating systems and/or applications where speech input is an option, systems without keyboards, and so forth.

Figure 3:
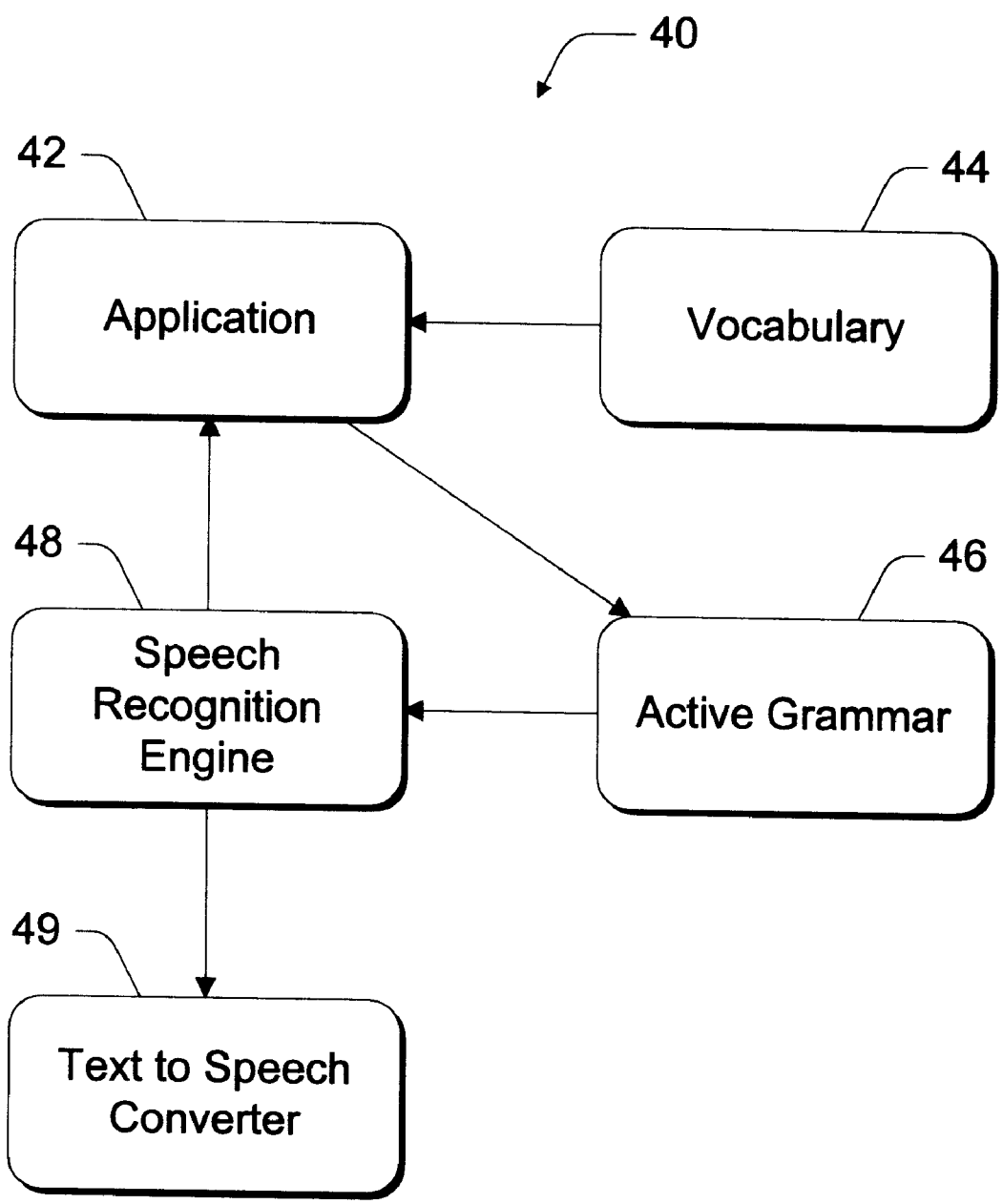
FIG. 3 is a functional block diagram of a discrete speech recognition system.

FIG. 3 shows a discrete speech recognition system 40 that recognizes individual words or phrases. As used herein, the term "utterances" means a word, phrase, or other spoken sound that is detectable as a voice input to the speech recognition system. The discrete speech recognition system 40 includes an application 42, a vocabulary 44, an active grammar 46, a speech recognition engine 48, and a text-to-speech converter 49. The application 42 may be essentially any kind of application that supports voice-input commands for operation. One suitable type of application is the command and control application where discrete commands are spoken to invoke a particular function. As possible examples, the application 42 might be a program to operate a vehicle radio, or a program to locate an address or destination, or a program to operate a telephone, or a program to open files on a computer, and so forth.

The vocabulary 44 is the complete list of utterances that are recognized by the application 42. The vocabulary 44 is stored in memory that can be accessed by the application. The active grammar 46 is a subset of the vocabulary that the recognition system is attempting to recognize at any one time. During operation, the application 42 extracts various subsets of utterances from vocabulary 44 and registers them as the active grammar. The active grammar 46 is stored in short-term memory or cache, which is accessible by the application 42 and the speech recognition engine 46.

Accordingly, the active grammar is changed as a result of changing the subsets of utterances contained in the active grammar.

The speech recognition engine 46 performs the actual task of recognizing utterances in the active grammar. It compares the voice input from the operator with utterances in the active grammar 46. Upon detection of an utterance listed in the active grammar 46, the speech recognition engine 46 informs the application 42 of the particular utterance that has been recognized. The application 42 then performs the function associated with the utterance.

The text-to-speech converter 49 converts textual data to audio data that can be audibly played by an audio output system (e.g., sound system) to form verbal feedback to the user. The text-to-speech converter 49, in conjunction with an audio output system, forms a text-to-speech enunciator that verbally enunciates words, numbers, phrases, or other recognizable speech.

It is noted that in an alternative implementation, the discrete speech recognition system may use canned speech rather than a text-to-speech converter. Canned speech refers to pre-recorded words that are played back. In either case, the system can output clear verbal words that are ascertainable by the user.

Figure 1:
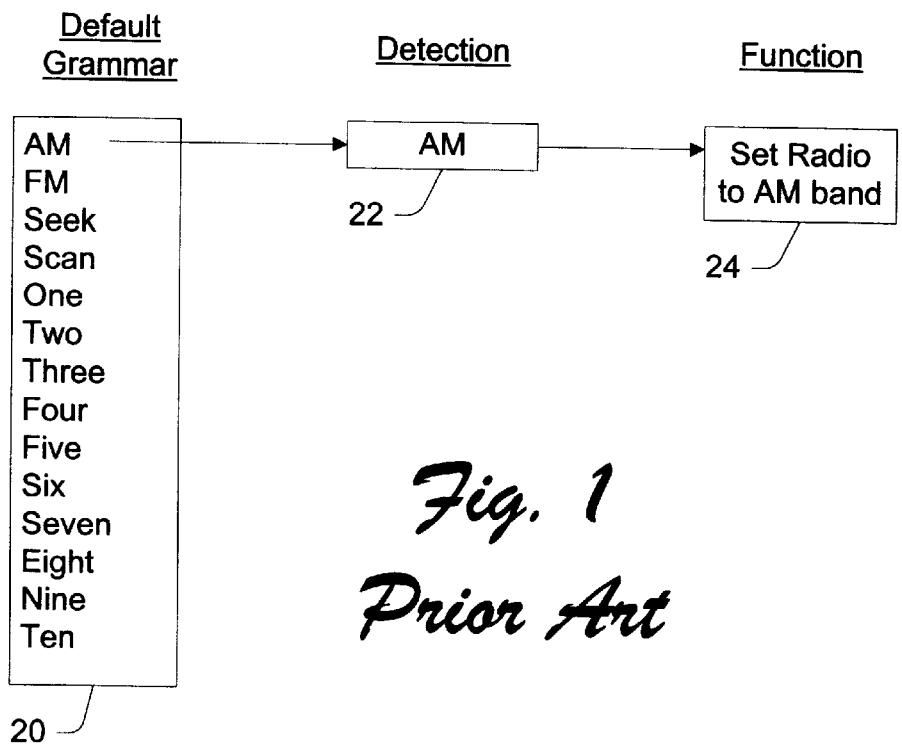
FIG. 1 shows a conventional approach of employing a large all-encompassing default grammar.
Figure 2:
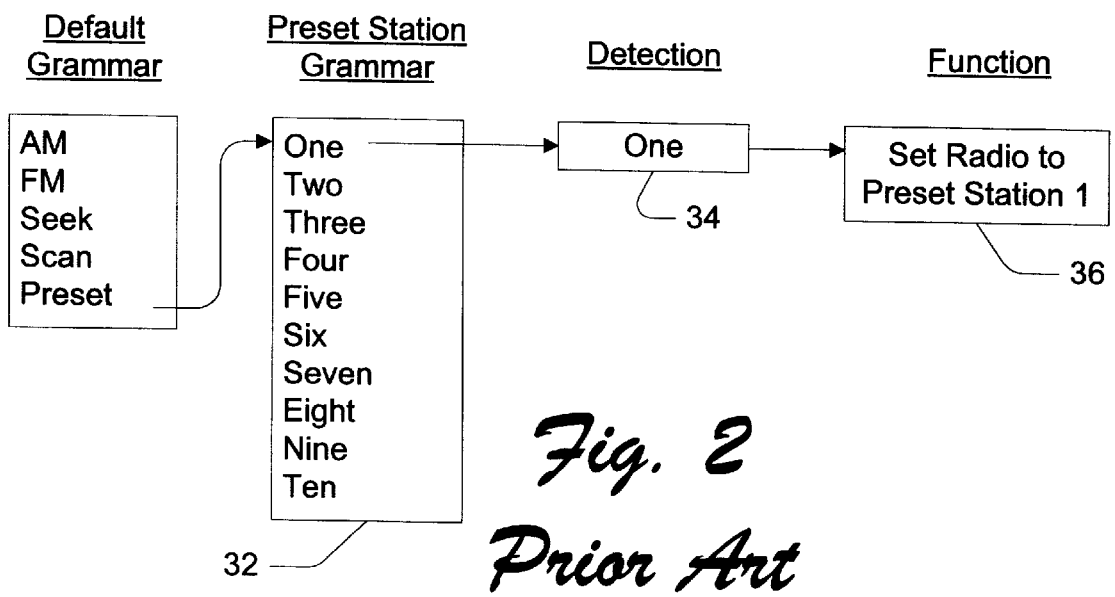
FIG. 2 shows a conventional approach of using a small default grammar and switching to a new grammar upon selection of a keyword.

The speech recognition system 40 begins with a default grammar as the active grammar. The default grammar has both keywords and non-keywords. "Keywords" are utterances that sole function is to change the active grammar. "Non-keywords" perform functions in the application. Upon detecting a word that is not a keyword in the default grammar, the speech recognition system 40 performs the function associated with the detected word. Upon detecting a keyword in the default grammar, the speech recognition system 40 changes the active grammar to another set of words or phrases. One approach is simply to provide a second word set that relates to the spoken keyword, as illustrated in the conventional grammar change of FIG. 2. A more preferred approach, however, is for the system to temporarily expand its active grammar from the default grammar to a ballooned grammar that includes both the words in the default grammar and the additional words triggered by detection of the keyword. That is, the application 42 extracts additional words from the vocabulary 44 and adds them to the active grammar 46. In this manner, the operator still has the option to select a word from the original grammar, or choose a word from the additional list.

As a result of the activation of different features or functions of the system, the user is faced with a new or different grammar. In this case, the user may not know what words and/or phrases are available to speak. The speech recognition system has an operator interface help function that offers help to the user by saying all of the available words or phrases. The user might say "Help," "What can I say," or some other word/phrase to invoke the help function. Upon detecting the help request, the speech recognition system obtains the list of utterances for the active grammar and with the assistance of the text-to-speech converter 49, begins verbally enunciating them for the user to hear. The operator interface thus provides useful information in a hands free, eyes-off environment without distracting the user from his/her primary task (e.g., driving).

The discrete speech recognition system 40 can be implemented in many different contexts. Two exemplary contexts are provided in this disclosure: an vehicle computer/entertainment accessory and a computing device. These implementations are discussed separately below.

Exemplary Context 1: Vehicle Accessory

Figure 4:
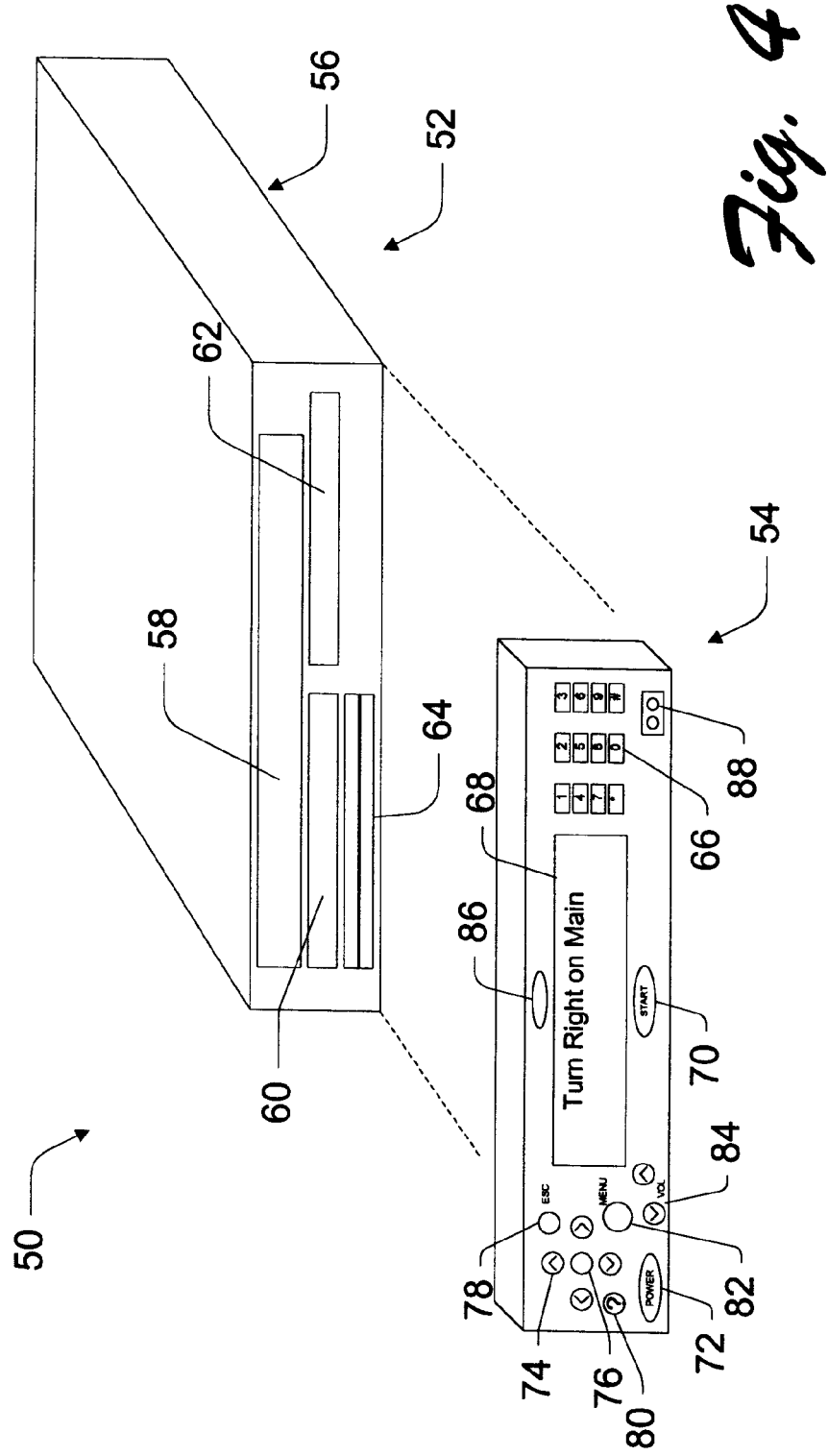
FIG. 4 is a diagrammatic illustration of a vehicle computer system that implements the discrete speech recognition system.

FIG. 4 shows an in-dash vehicle accessory 50 that implements the discrete speech recognition system 40. In the illustrated implementation, the vehicle accessory 50 is a vehicle computer system that includes a variety of different elements such as a security subsystem, a navigation subsystem, and an entertainment subsystem. In other embodiments, the accessory might be a car radio, cassette player, CD player, or similar device. The speech recognition system facilitates voice activation of the accessory 50, or its features, to permit the driver to verbally enter commands in a hands-free, eyes-free environment.

Vehicle accessory 50 has a base module 52 and a detachable faceplate 54. Base module 52 includes a housing 56, which is sized to be mounted in a vehicle dashboard similar to a conventional car stereo. Preferably, housing 56 has a form factor of a single DIN (Deutsche Industry Normen). The base module could alternatively be housed in a 2 DIN unit or other special form factor for an OEM.

Base module 52 is a computer that runs a multi-tasking operating system to support multiple applications. One preferred operating system is a Windows brand operating system sold by Microsoft Corporation, such as Windows 95, Windows CE, Windows NT or other derivative versions of the Windows family of operating systems. The computer and operating system are configured to support after-market peripherals including both hardware and software components.

The computer 52 includes at least one storage drive that permits the vehicle user to download programs and data from a storage medium. In the illustrated implementation, the computer 52 has a CD ROM drive 58 that reads application-related CDs, as well as musical, video, game, or other types of entertainment CDs. In this manner, the CD ROM drive 58 performs a dual role of storage drive and entertainment player. Also, a hard disk drive (not shown in FIG. 4) that can be used for storing both application programs and user data is included on the computer module 52. The computer base module 52 has an optional 3.5" floppy diskette drive 60, a smart card reader 62, and dual PCMCIA card sockets 64 which accept PC (or PCMCIA) card types II and III. The faceplate 54 can be rotated to expose and permit easy access to the storage drives. In other implementations, the faceplate 54 has slots to permit access to one or more of the memory drives.

Faceplate 54 has a keypad 66 and a graphical display 68. The display 68 is preferably a backlit LCD having a rectangular array of pixels that are individually selectable for illumination or display. The display element is a medium-resolution, bit-mapped display system having at least 10,000 pixels. In the described implementation, the array of pixels has a size of at least 64 by 256 pixels. The operating system of base module 52 interacts with faceplate keypad 66 and faceplate display 68 as peripheral devices when the faceplate 54 is attached to the base module 52.

The faceplate 54 has a start button 70 that provides the familiar "Start" functions of a Windows brand operating system. The faceplate 54 also has a power button 72, a four-position actuator 74, an "enter" button 76, an "escape" button 78, a "help" button 80, a "menu" button 82, and a volume control input 84.

The accessory 50 has a voice input port 86 that picks up voice commands from the operator for entry into the speech recognition system. The accessory also supports an IrDA (infrared developers association) transceiver port 88 mounted on the faceplate 54 to transmit and receive data and programs using infrared signals.

Vehicle accessory 50 can be used to integrate multiple vehicle-related systems onto one open platform. For instance, the system can serve as a multimedia entertainment system, a navigation system, a communications system, a security system, and a diagnostics system. Moreover, the system provides additional functionality traditionally associated with desktop and laptop personal computers. For instance, with the addition of a peripheral display device, it can support word processing applications, spreadsheet applications, database applications, and appointment/schedule applications. Furthermore, the vehicle computer system 50 can be configured to operate as a server to other computing units in a vehicle to distribute games, video movies, and the like to passengers.

Vehicle accessory 50 may support a number of components and features that are not discussed herein. For more detail regarding such features refer to a U.S. Pat. No. 5,794,164, entitled "Vehicle Computer System," which was issued Aug. 11, 1998 and is assigned to Microsoft Corporation. This patent is hereby incorporated by reference.

Figure 5:
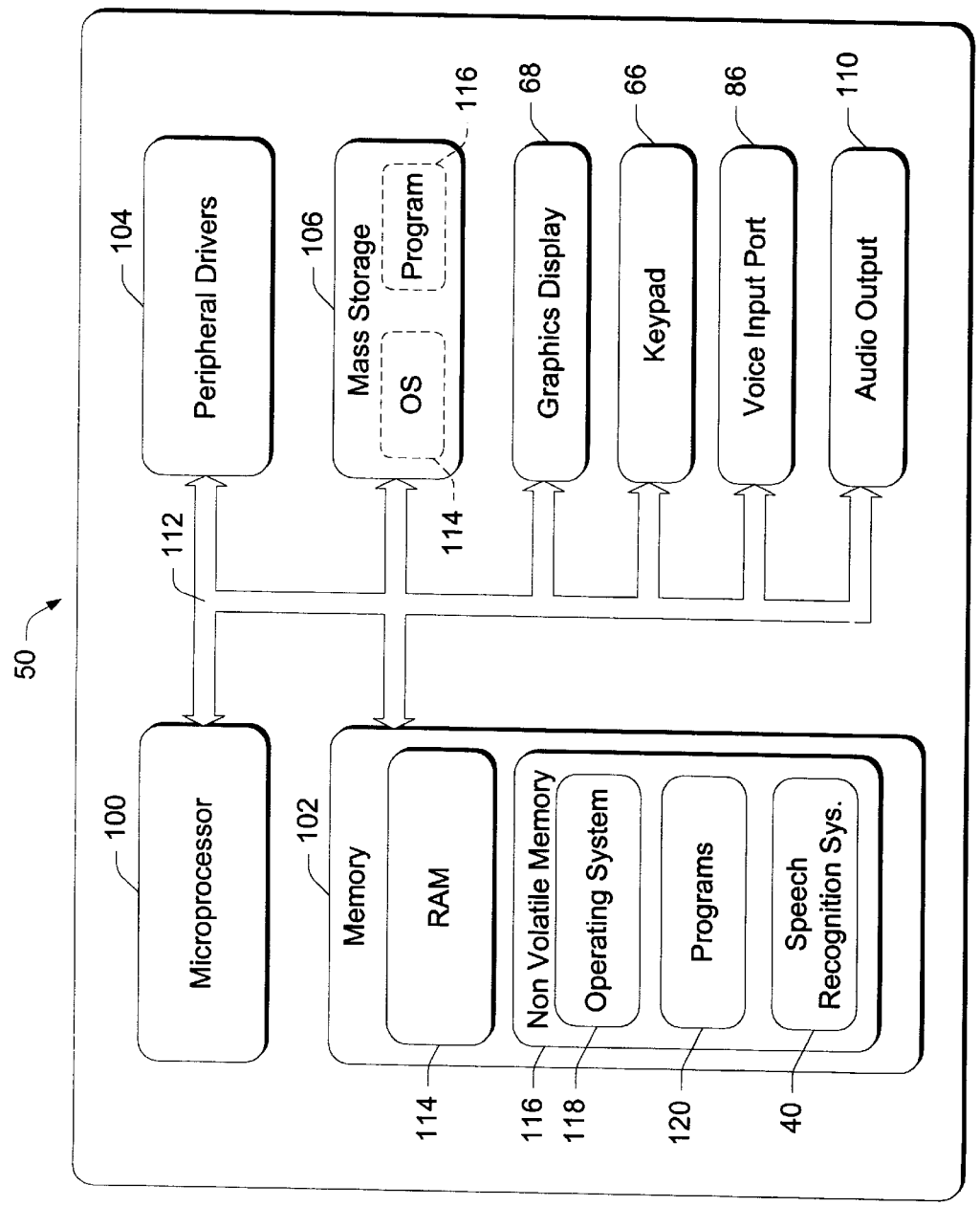
FIG. 5 is a block diagram of the vehicle computer system of FIG. 4.

FIG. 5 is a simplified block diagram showing pertinent components of vehicle accessory 50. It has a conventional computer architecture, including a microprocessor 100, associated addressable memory 102, peripheral drivers 104, and optional mass storage 106. In addition, accessory 50 includes keypad 66, a graphics display 68, a voice input port 86, and an audio output 110. The various components communicate internally through a parallel data bus 112.

The addressable memory 102 is shown to include high-speed volatile memory 114 and non-volatile memory 116. An operating system 118 and one or more programs 120 are stored in memory 116 and execute on the microprocessor 100. Alternatively, the operating system and programs can be stored in mass storage 106 (as represented by the dashed boxes). Other components, not shown, provide different types of entertainment functionality as described in the patent cited above.

In the illustrated implementation, the speech recognition system 40 is embodied as a computer program or callable modules that are stored in memory 116 and executed on microprocessor 100. Voice commands are entered into the vehicle computer via the voice input port 86. The speech recognition system 40 receives voice commands and performs functions based upon recognized commands. Feedback in the form of verbal responses from the speech recognition system is output via the audio output 110.

In this configuration, the voice input port 86, the text-to-speech converter 49, and the audio output 110 effectively form an operator interface to assist the user in navigating the grammars supported by the speech recognition system. The voice input receives the user's spoken commands, including the help command (e.g., "What can I say"). In response to recognition of this help command, the text-to-speech converter creates audio data representing the verbal enunciation of the words or phrases in the active grammar. The audio data is then played by the audio output to verbally enunciate the words or phrases to the user.

The data processor 100 is programmed by means of instructions stored at different times in the various computer-readable storage media of the device. Programs are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps and features described below in conjunction with a microprocessor or other data processor. The invention also includes the computer and other devices themselves when programmed according to the methods and techniques described below.

Exemplary Context 2: Computing Device

Figure 6:
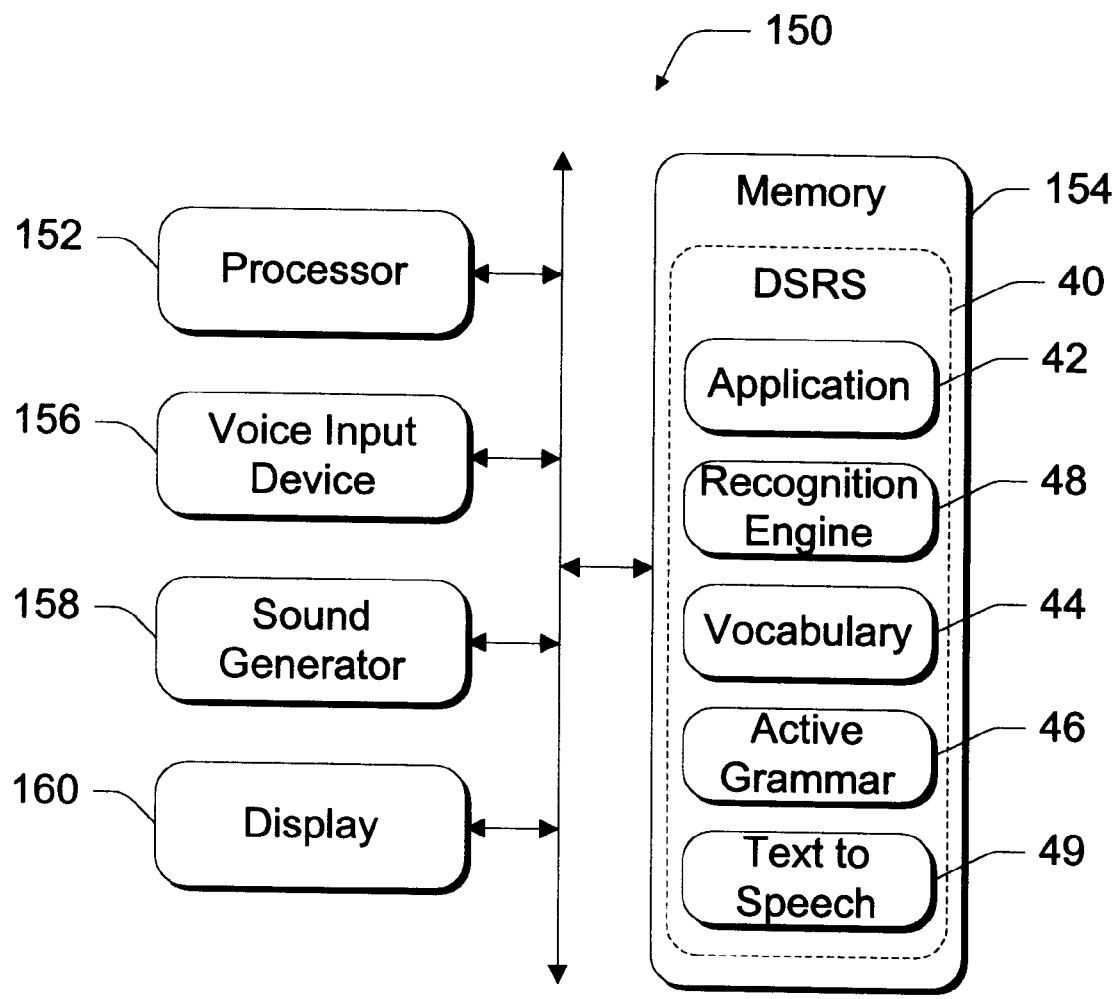
FIG. 6 is a block diagram of a more general computer device used to implement the speech recognition system.

The speech recognition system 40 may be implemented in devices other than a vehicle accessory. To provide another example for discussion purposes, FIG. 6 is a simplified block diagram of a computing device 150 that implements the discrete speech recognition system (DSRS) 40. The computing device 150 has a processor 152, associated addressable memory 154 (including non-volatile memory and high-speed volatile memory), a voice input device 156, a sound generator 158, and a display 160. The speech recognition system 40 is embodied as a software or firmware program stored or embedded in memory 154 and executes on the processor 152. The speech recognition program 40 has an application 42, a predefined vocabulary 44, an active grammar 46, a recognition engine module 48, and a text-to-speech converter 49. The sound generator 158 in conjunction with the text-to-speech converter 49 forms a speech enunciator that is capable of verbally saying words, numbers, and/or phrases.

The computer device 150 is representative of many diverse products. Examples of representative products include pagers, cellular phones, handheld personal information devices, stereos, VCRs, set-top boxes, calculators, appliances, and so forth. It may also represent computers such as desktop computers, laptop computers, handheld computers, and other types of computer-based products. The computer device 150 may also represent dedicated machines including ATMs (automated teller machines), kiosks, ticket booths, and vending machines. Also, it may be used in systems that provide no keyboard entry and rely primarily on speech as the user entry mechanism, such as automated telephone systems, In the context of such devices, the speech recognition system 40 may be implemented as independent software or implemented into an application or operating system. The speech recognition system 40 may be used in discrete or continuous settings to assist user navigation.

Operation of Grammar Help Command

Figure 7:
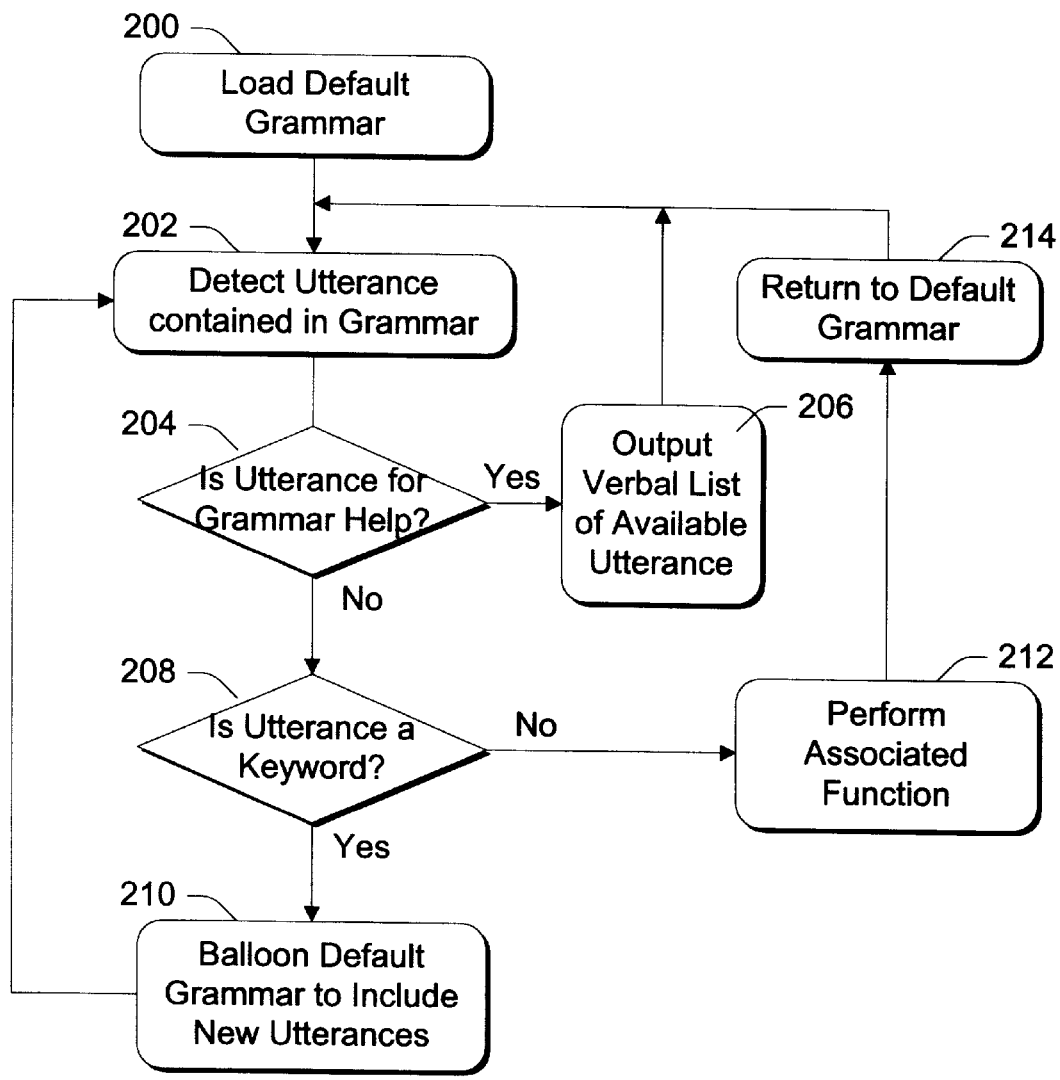
FIG. 7 is a flow diagram showing steps in a method for operating a speech recognition system.

FIG. 7 shows steps in a method for operating the speech recognition system in a manner that improves human interaction with the system. The process is described with additional reference to an exemplary grammar context illustrated of FIG. 8.

At step 200 in FIG. 7, the application 42 in the speech recognition system 40 extracts a default grammar from the vocabulary 44 and loads the default grammar into the active grammar 46. For purpose of continuing discussion, suppose the discrete speech recognition system 40 is implemented to control an address book program implemented by the vehicle computer/entertainment accessory 50 or the computing device 150. It is noted that the speech recognition system can be used to control many other functions in addition to an address book. Other controllable functions include operating a radio or stereo parameters, adjusting temperature control, operating a cellular phone, operating a CD player, locking and unlocking doors, lowering and raising windows, and so forth.

Figure 8:
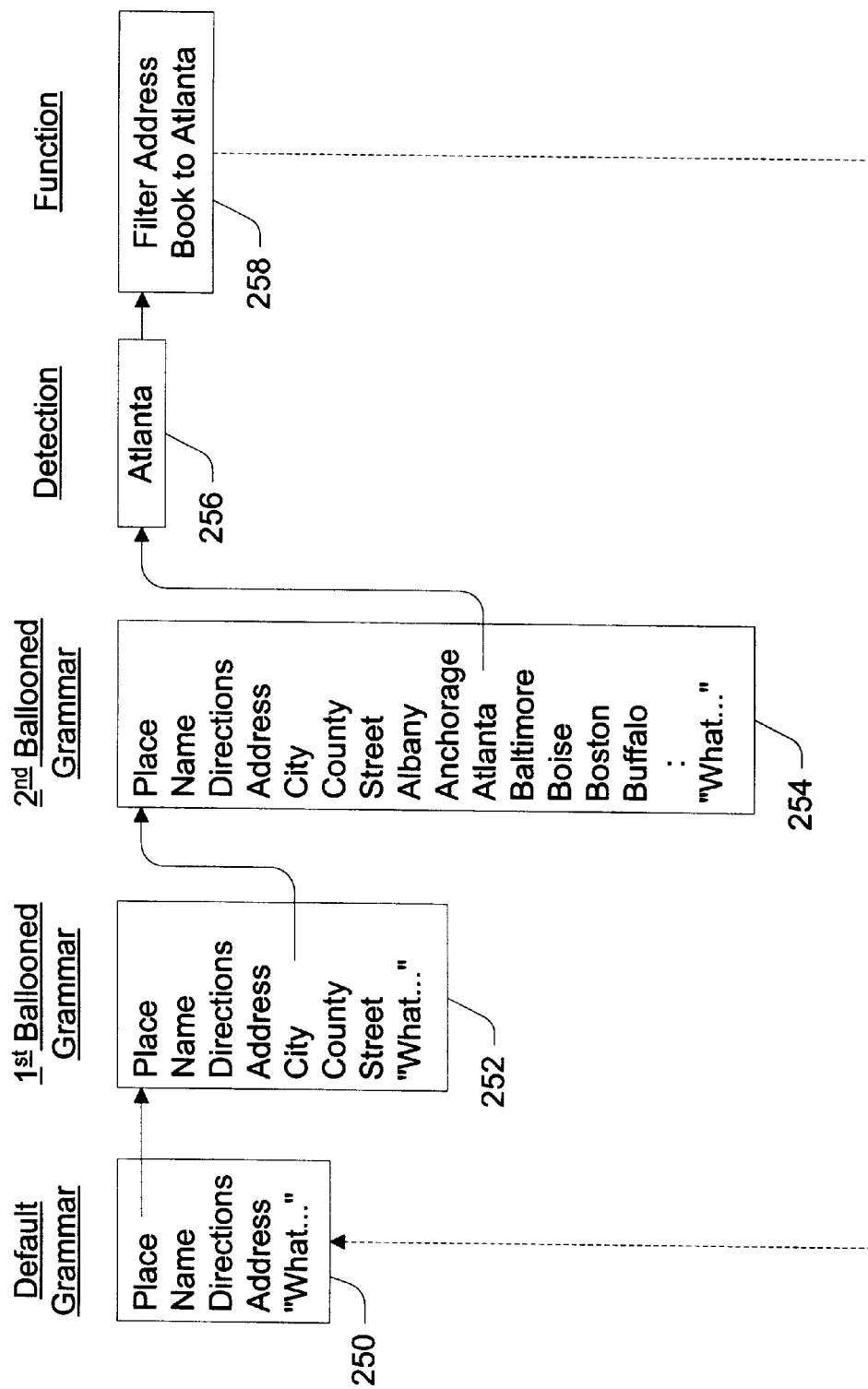
FIG. 8 illustrates how a default grammar is expanded multiple times to create multiple ballooned grammars during operation.

The default grammar, referenced by number 250 in FIG. 8, contains five utterances: "Place," "Name," "Directions," "Address," and "What can I say." Table 4 lists the default grammar and associated functions.

TABLE 4

Default Grammar 250

| Word/Phrase | Command Function |
|---|---|
| Place | Keyword to Place menu |
| Name | Sets address book to specified name. |
| Directions | Keyword to Directions menu |
| Address | Keyword to Address menu |
| What Can I Say | Causes verbal response saying "Place," "Name," "Directions," "Address," and "What Can I Say." |

The first, third, and fourth utterances—"Place," "Directions," and "Address"—are keyword utterances and the second utterance—"Name"—is a non-keyword utterance. Keyword utterances are used to balloon the active grammar to include utterances in addition to the default grammar. The last utterance—"What can I say"—invokes a verbal response from the system that reads the utterances in the default grammar.

At step 202 in FIG. 7, the speech recognition engine 48 begins listening to speech patterns in an effort to detect an utterance contained in the default grammar 250. The speech recognition engine 48 takes no action on utterances that are not contained in the active grammar. To leave step 202 and proceed with steps 204–214 in the flow diagram of FIG. 7, it is assumed that the user speaks an utterance contained in the active grammar.

At step 204, the speech recognition determines if a spoken utterance is the grammar help phrase "What can I say." If it is (i.e., the "yes" branch from step 204), the text-to-speech converter 49 generates verbal responses that can be emitted via the audio output 110 (or 158) to say the words in the active grammar (step 206). In this case, the default grammar is active and the speech recognition system says the words "Place," "Name," "Directions," "Address," and "What Can I Say" in response to the user's question "What can I say." The system may also be configured to concurrently display the available words on the display 68 (or 160).

It is noted that in one implementation, the user can interrupt this verbal response anytime. If the user hears or otherwise remembers their desired choice, the user may speak that option and the system will respond to the recognized command. In this situation, the system ceases reading off the available words. In another implementation, the user is not permitted to barge in, but instead presses a button on the device to stop the system from reading off the words.

With reference again to step 204, if the utterance is not the grammar help phrase (i.e., the "no" branch from step 204), the speech recognition engine 48 determines whether the utterance is a keyword (step 208). If the user had spoken a keyword such as "Place" (i.e., the "yes" branch from step 208), the speech recognition system temporarily expands the default grammar to include an additional set of utterances triggered by the keyword (step 210 in FIG. 5). In this case, the extra utterances are location-related terms, "City," "County," and "Street," as shown in grammar 252 of FIG. 8. Table 5 lists the ballooned grammar.

TABLE 5

Ballooned Grammar 252

| Word/Phrase | Command Function |
|---|---|
| Place | Keyword to place menu |
| Name | Sets address book to specified name. |
| Directions | Keyword to Directions menu |
| Address | Keyword to address menu |
| City | Keyword to list of cities |
| County | Keyword to list of counties |
| Street | Keyword to list of streets |
| What Can I Say | Causes verbal Response listing above Words |

After the active grammar is expanded, the system continues to monitor for any utterance in the ballooned grammar (step 202). If the user speaks the grammar help phrase "What can I say" this time, the text-to-speech converter 49 generates verbal responses that can be emitted via the audio output 110 (or 158) to say the words in the ballooned grammar: "Place," "Name," "Directions," "Address," "City," "County," and "Street."

Suppose that the user next speaks the word "City," which is also a keyword. When the speech recognition engine 48 detects the keyword "City," the first ballooned grammar is further expanded to a second ballooned grammar 254 that adds the names of various U.S. cities, such as "Albany," "Anchorage," "Atlanta," "Baltimore," "Boise," "Boston," "Buffalo," and so forth (step 210). The second ballooned grammar 254 thus contains the original words in the default grammar 250, the added words in the first ballooned grammar 252, and the new city names.

Next, suppose the user says the word "Atlanta." The speech recognition system recognizes the utterance "Atlanta" (i.e., step 202 and the "no" branch from step 204). This is also represented by numeral 256 in FIG. 8. In this case, the utterance is not a keyword (i.e., the "no" branch from step 208 in FIG. 7) and the application 42 performs a function associated with the non-keyword utterance (step 212). Here, the associated function is to filter the address book to entries pertaining to the city Atlanta, as represented by number 258 in FIG. 8.

After the associated operation is performed, the speech recognition system returns to the small default grammar (step 214 in FIG. 7). This is represented diagrammatically in FIG. 8 by the dashed return arrow to the default grammar 252.

The ballooning grammar aspects of this description are described in more detail in co-pending U.S. patent application Ser. No. 09/003,055, entitled "Discrete Speech Recognition System with Ballooning Active Grammar," which was filed Jan. 5, 1998, in the name of Steven P. Masters. This application is assigned to Microsoft Corporation and is incorporated by reference.

The speech recognition help system is advantageous because it provides an easy operator interface to help a user navigate through the changing grammars. Any time the user gets stuck, he/she simply asks, "What can I say." The system responds with a verbal list of currently available options. The operator interface provides useful information in a hands free, eyes-off environment without distracting the user from his/her primary task, such as driving an automobile.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A speech recognition system comprising:
   an application;
   a vocabulary accessible by the application, the vocabulary including a set of utterances applicable to the application;
   an active grammar containing a first subset of utterances from the vocabulary, the first subset comprising one or more keyword utterances, a plurality of non-keyword utterances, and a help command;
   a speech recognition engine to recognize the utterances in the active grammar;
   an operator interface to:
   (a) expand the active grammar to contain both the first subset of utterances and a second subset of utterances from the vocabulary in response to detection by the speech recognition engine of the keyword utterance, wherein the active grammar remains expanded until a non-keyword utterance is detected; and
   (b) verbally enunciate the utterances contained in the active grammar in response to recognition by the speech recognition engine of the help command.

2. A speech recognition system as recited in claim 1, wherein the operator interface also lists the utterances on a display in response to recognition of the help command.

3. An operating system that incorporates the speech recognition system as recited in claim 1.

4. A speech recognition system as recited in claim 1, wherein the active grammar remains expanded until both a non-keyword utterance is detected and an operation that corresponds to the non-keyword utterance is complete.

5. A speech recognition system as recited in claim 1, wherein the second subset of utterances contains another keyword and during a third instance following detection of said another keyword, the grammar is expanded a second time to contain the first and second subsets of utterances and a third subset of utterances from the vocabulary.

6. A speech recognition system as recited in claim 5, wherein selected utterances from the first or second subsets of utterances are removed from the doubly expanded grammar.

7. A speech recognition system as recited in claim 1, wherein the one or more keyword utterances do not have an associated function other than to expand the active grammar.

8. A speech recognition system comprising:
   an application;
   a vocabulary accessible by the application, the vocabulary holding a set of utterances applicable to the application;
   an active grammar that holds a first subset of the utterances in the vocabulary, the first subset of utterances including a keyword utterance, a plurality of non-keywords, and a help command;
   a speech recognition engine to recognize the utterances in the active grammar, whereupon detection of the keyword utterance causes a change in the active grammar from the first subset of the utterances to a second subset of the utterances, the changed grammar comprising both the first subset of utterances and the second subset of utterances in the vocabulary, the active grammar being reduced to the first subset of utterances upon detection of a non-keyword utterance and upon completion of an operation that corresponds to the non-keyword utterance; and
   an operator interface that verbally enunciates to a user the utterances currently contained in the active grammar in response to recondition by the speech recognition engine of the help command.

9. A speech recognition system as recited in claim 8, wherein the operator interface also list the utterances on a display in response to recognition of the help command.

10. An entertainment system incorporating the speech recognition system as recited in claim 8.

11. A computing device incorporating the speech recognition system as recited in claim 8.

12. An operating system incorporating the speech recognition system as recited in claim 8.

13. A speech recognition system as recited in claim 8, wherein the active grammar is reduced to the first subset of utterances upon detection on a non-keyword utterance.

14. A speech recognition system as recited in claim 8, wherein the selected ones of the utterances do not have an associated function other than to expand the active grammar.

15. An operator interface for a speech recognition system, the speech recognition system being configured to recognize a set of utterances, the operator interface comprising:
   a vocabulary comprising the set of utterances;
   an active grammar that includes a first subset of the utterances in the vocabulary, the first subset of utterances including a help command, one or more keyword utterances, and a plurality of non-keyword utterances;
   an audio input that receives audible utterances and passes the utterances to
   the speech recognition system for recognition;
   an audio speech generator that verbally enunciates the utterances in the active grammar in response to recognition by the speech recognition system of the help command;
   wherein the operator interface upon recognition of the keyword utterance temporarily adds a second subset of utterances from the vocabulary to the active grammar so that the active grammar includes both the first and second subset of utterances, and wherein the active grammar is reduced back to include only the first subset of utterances after detection of a non-keyword utterance.

16. An operator interface as recited in claim 15, wherein the audio speech generator comprises:
   a text-to-speech converter to create audio data representing the verbal enunciation of the utterances; and
   an audio output to play the audio data and verbally enunciate the utterances.

17. A speech recognition system incorporating the operator interface as recited in claim 15.

18. A computing device incorporating the operator interface as recited in claim 15.

19. An operator interface as recited in claim 15, wherein the active grammar remains expanded until both a non-keyword utterance is detected and an operation that corresponds to the non-keyword utterance is complete.

20. An operator interface as recited in claim 15, wherein the one or more keyword utterances do not have an associated function other than to expand the active grammar.

21. A vehicle computer system comprising:
   a computer;
   an open platform operating system executing on the computer, the operating system being configured to support multiple applications;
   a vocabulary comprising a set of utterances;

an active grammar that includes a first subset of the utterances in the vocabulary, the first subset of utterances comprising a help command, a keyword utterance, and a plurality of non-keyword utterances;

a speech recognition system to detect utterances used to control at least one of the applications running on the computer, the keyword utterance, the non-keyword utterances, and the help command utterance, the speech recognition system having an operator interface that:

(a) expands the active grammar to contain both the first subset of utterances and a second subset of utterances from the vocabulary in response to detection by the speech recognition engine of the keyword utterance, wherein the active grammar remains expanded until a non-keyword utterance is detected, and (b) verbally enunciates to a user the utterances contained in the active grammar in response to detection of the help command utterance.

22. A vehicle computer system as recited in claim 21, wherein the operator interface also lists the utterances on a display in response to recognition of the help command utterance.

23. A vehicle computer system as recited in claim 21, wherein the active grammar remains expanded until both a non-keyword utterance is detected and an operation that corresponds to the non-keyword utterance is complete.

24. A vehicle computer system as recited in claim 21, wherein the expanded active grammar includes a different keyword and whereupon detection of the different keyword, the speech recognition system is configured to expand the active grammar a second time to include the first set of utterances, the second set of utterances, and a third set of utterances.

25. A vehicle computer system as recited in claim 24, wherein the speech recognition system removes selected utterances from the active grammar.

26. A vehicle computer system as recited in claim 21, wherein the keyword utterance does not have an associated function other than to expand the active grammar.

27. In a speech recognition system having an active grammar, the active grammar including a default set of utterances, the default set of utterances including a keyword utterance and a help command, a method for operating the speech recognition system, comprising the following steps:

recognizing the keyword utterance;

in response to recognition of the keyword utterance, ballooning the active grammar to temporarily include both the default set of utterances and a new set of utterances, the active grammar remaining ballooned until a non-keyword utterance is detected, the ballooned active grammar further comprising the non-keyword utterance;

recognizing the help command; and verbally enunciating the utterances in the active grammar in response to recognition of the help command.

28. A method as recited in claim 27, further comprising reducing the active grammar to the default set of utterances both after recognition of a non-keyword utterance and after completion of an operation that corresponds to the non-keyword utterance.

29. A computer-readable medium as recited in claim 27, wherein the keyword utterance does not have an associated function other than to expand the active grammar.

30. A computer-readable medium comprising instructions for performing steps comprising:

listening for a first predetermined set of utterances that includes a help command, a keyword utterances and a plurality of non-keyword utterances;

in response to detection of the keyword utterance, expanding the predetermined set of utterances to include both the predetermined set of utterances and a second predetermined set of utterances, wherein the utterances remain expanded until detection of a non-keyword utterance;

recognizing the help command; and in response to recognition of the help command, creating audio data representing verbal enunciation of the utterances in the predetermined set.

31. A computer-readable medium as recited in claim 30, wherein the keyword utterance does not have an associated function other than to expand the active grammar.

* * * * *

UNITED STATES PATENT AND TRADEMARK OFFICE
CERTIFICATE OF CORRECTION

PATENT NO. : 6,298,324 B1
DATED : October 2, 2001
INVENTOR(S) : Sarah E. Zuberec Page 1 of 1

It is certified that error appears in the above-identified patent and that said Letters Patent is hereby corrected as shown below:

<u>Column 12,</u>
Line 3, replace "recondition" with -- recognition --.
Line 16, replace "on" with -- of --.

<u>Column 14,</u>
Line 25, change "utterances" to -- utterance --.

Signed and Sealed this

Nineteenth Day of March, 2002

Attest:

JAMES E. ROGAN
Director of the United States Patent and Trademark Office

*Attesting Officer*